US006536036B1

(12) United States Patent
Pavela

(10) Patent No.: US 6,536,036 B1
(45) Date of Patent: Mar. 18, 2003

(54) METHOD AND APPARATUS FOR MANAGING CODE TEST COVERAGE DATA

(75) Inventor: Thomas J. Pavela, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/286,771

(22) Filed: Apr. 6, 1999

Related U.S. Application Data

(60) Provisional application No. 60/097,266, filed on Aug. 20, 1998.

(51) Int. Cl.[7] ................................................. G06F 9/44
(52) U.S. Cl. ..................................... 717/125; 707/104.1
(58) Field of Search ................................ 717/4, 3, 7, 8, 717/9, 124, 120, 146, 143, 151, 125–135; 702/119, 123; 707/100, 101, 104.1, 200, 203, 204

(56) References Cited

U.S. PATENT DOCUMENTS

| | | | | |
|---|---|---|---|---|
| 4,853,851 A | | 8/1989 | Horsch ........................ | 714/38 |
| 4,931,928 A | * | 6/1990 | Greenfeld ................... | 717/131 |
| 5,182,806 A | | 1/1993 | McKeeman et al. ........ | 717/145 |
| 5,390,330 A | * | 2/1995 | Talati ......................... | 717/104 |
| 5,644,692 A | * | 7/1997 | Eick ........................... | 345/833 |
| 5,651,111 A | | 7/1997 | McKeeman et al. ......... | 714/38 |
| 5,673,387 A | | 9/1997 | Chen et al. .................. | 714/38 |
| 5,748,878 A | | 5/1998 | Rees et al. ................... | 714/38 |
| 5,754,760 A | | 5/1998 | Warfield ..................... | 714/38 |
| 5,761,408 A | | 6/1998 | Kolawa et al. .............. | 714/38 |
| 5,778,169 A | | 7/1998 | Reinhardt ................... | 714/38 |
| 5,862,382 A | * | 1/1999 | Kataoka ..................... | 717/131 |
| 5,920,725 A | * | 7/1999 | Ma et al. .................... | 717/171 |
| 6,195,795 B1 | * | 2/2001 | Block et al. ................ | 717/101 |

FOREIGN PATENT DOCUMENTS

| JP | 2-058136 A | 2/1990 | ........... G06F/11/28 |
|---|---|---|---|
| JP | 3-176744 A | 7/1993 | ........... G06F/11/28 |

OTHER PUBLICATIONS

"Automatic Unit Text Matrix Generation" IBM Technical Bulletin, vol. 37, No. 06A, Jun. 1994.
"Code Coverage Measurement" IBM Technical Bulletin, vol. 33, No. 8, Jan. 1991.
"Determination of Code Coverage" IBM Technical Disclosure Bulletin, vol. 25, No. 6, Nov. 1982.
"Function Level Unit Test Environment" IBM Technical Disclosure Bulletin, vol. 36, No. 1, Jan. 1993.
"Measuring Completeness of a Test Case Library" IBM Technical Disclosure Bulletin, vol. 23, No. 9, Feb. 1981.
"Software Test Coverage Measurement" IBM Technical Disclosure Bulletin, vol. 39, No. 8, Aug. 1996.
"Test Case Generator" IBM Technical Disclosure Bulletin, vol. 23, No. 9, Feb. 1981.
Jillian Ye et al.; "What is Uncovered by Coverage Testing" Excerpt from http://w3.torolab.ibm.com/D881/mack/tr74158.htm on the World Wide Web, Aug. 21, 1998.

* cited by examiner

Primary Examiner—Gregory Morse
Assistant Examiner—Hoang-Vu Antony Nguyen-Ba
(74) Attorney, Agent, or Firm—Sughrue Mion, PLLC

(57) ABSTRACT

A method and apparatus for code coverage management is provided, wherein code coverage data, which may be stored in a database, is updated or resequenced with the code changes. This resequencing eliminates the need to freeze the program code while collecting the code coverage data. When a code change is incorporated into the system the resequencing routine makes the necessary adjustments to the code coverage data. Furthermore, building a table in a database to store code coverage data for every test case may not be feasible. Thus, in accordance with the present invention, the last column of the table may contain a pointer to a file. The file then contains the list of test cases that exceeded the table.

24 Claims, 13 Drawing Sheets

FIGURE 2

```
00001   Program X
00002   Savearg = arg
00003   REST=UPPER(SaveArg)
00004   PARSE REST WITH 'DB=' DB .
00005   PARSE REST WITH 'DBMST=' DBMST .
00006   /*************************************/
00007   /* Create DB list                    */
00008   /*************************************/
00009   if DB ¬= "" then
00010     do
00011       odb = "@"|| DB
00012       Push ODB||' ON'
00013       DBR_DB_List = DB
00014     end
00015   else
00016     do
00017       Resource_List = "
00018       if DBMST ¬= "" then
00019         do
00020           Call Create_Lists 'DBMST' DBMST
00021           Resource_List = DBR_DB_List || Resource_list
00022         end
00023     end
00024   Return
```

FIGURE 3

| Code Lines | | Status | | | OVERFLOW |
|---|---|---|---|---|---|
| 00001 | Program X | U | | | |
| 00002 | Savearg = arg | U | | | |
| 00003 | REST=UPPER(SaveArg) | U | | | |
| 00004 | PARSE REST WITH 'DB=' DB . | U | | | |
| 00005 | PARSE REST WITH 'DBMST=' DBMST . | U | | | |
| 00006 | /*******************************/ | X | | | |
| 00007 | /* Create DB list           */ | X | | | |
| 00008 | /*******************************/ | X | | | |
| 00009 | if DB ¬= "" then | U | | | |
| 00010 | do | U | | | |
| 00011 | odb = "@"|| DB | U | | | |
| 00012 | Push ODB||' ON' | U | | | |
| 00013 | DBR_DB_List = DB | U | | | |
| 00014 | end | U | | | |
| 00015 | else | U | | | |
| 00016 | do | U | | | |
| 00017 | Resource_List = '' | U | | | |
| 00018 | if DBMST ¬= "" then | U | | | |
| 00019 | do | U | | | |
| 00020 | Call Create_Lists 'DBMST' DBMST | U | | | |
| 00021 | Resource_List = DBR_DB_List || Resource_list | U | | | |
| 00022 | end | U | | | |
| 00023 | end | U | | | |
| 00024 | Return | U | | | |

FIGURE 4

| Code Lines | | Status | TC1 | | OVERFLOW |
|---|---|---|---|---|---|
| 00001 | Program X | T | T | | |
| 00002 | Savearg = arg | T | T | | |
| 00003 | REST=UPPER(SaveArg) | T | T | | |
| 00004 | PARSE REST WITH 'DB=' DB . | T | T | | |
| 00005 | PARSE REST WITH 'DBMST=' DBMST . | T | T | | |
| 00006 | /******************************/ | X | | | |
| 00007 | /* Create DB list          */ | X | | | |
| 00008 | /******************************/ | X | | | |
| 00009 | if DB ¬= "" then | T | T | | |
| 00010 | do | T | T | | |
| 00011 | odb = "@"|| DB | T | T | | |
| 00012 | Push ODB||' ON' | T | T | | |
| 00013 | DBR_DB_List = DB | T | T | | |
| 00014 | end | T | T | | |
| 00015 | else | U | | | |
| 00016 | do | U | | | |
| 00017 | Resource_List = '' | U | | | |
| 00018 | if DBMST ¬= "" then | U | | | |
| 00019 | do | U | | | |
| 00020 | Call Create_Lists 'DBMST' DBMST | U | | | |
| 00021 | Resource_List = DBR_DB_List || Resource_list | U | | | |
| 00022 | end | U | | | |
| 00023 | end | U | | | |
| 00024 | Return | T | T | | |

FIGURE 5

| Code Lines | | Status | TC1 | TC2 | OVERFLOW |
|---|---|---|---|---|---|
| 00001 | Program X | T | T | T | |
| 00002 | Savearg = arg | T | T | T | |
| 00003 | REST=UPPER(SaveArg) | T | T | T | |
| 00004 | PARSE REST WITH 'DB=' DB . | T | T | T | |
| 00005 | PARSE REST WITH 'DBMST=' DBMST . | T | T | T | |
| 00006 | /*********************************/ | X | | | |
| 00007 | /* Create DB list                */ | X | | | |
| 00008 | /*********************************/ | X | | | |
| 00009 | if DB ¬= "" then | T | T | T | |
| 00010 | do | T | T | | |
| 00011 | odb = "@"|| DB | T | T | | |
| 00012 | Push ODB||' ON' | T | T | | |
| 00013 | DBR_DB_List = DB | T | T | | |
| 00014 | end | T | T | | |
| 00015 | else | T | | T | |
| 00016 | do | T | | T | |
| 00017 | Resource_List = '' | T | | T | |
| 00018 | if DBMST ¬= "" then | T | | T | |
| 00019 | do | U | | | |
| 00020 | Call Create_Lists 'DBMST' DBMST | U | | | |
| 00021 | Resource_List = DBR_DB_List || Resource_list | U | | | |
| 00022 | end | U | | | |
| 00023 | end | T | | T | |
| 00024 | Return | T | | T | |

FIGURE 6

```
00001     Program X
00002     Savearg = arg
00003     REST=UPPER(SaveArg)
00004     PARSE REST WITH 'DB=' DB .
00005     PARSE REST WITH 'DBMST=' DBMST .
00006     PARSE REST WITH 'PART=' PART .
00007     /************************/
00008     /* Create DB list       */
00009     /************************/
00010     if DB ¬= "" then
00011       do
00012         odb = "$"||DB
00013         Push  ODB|| '=ON'
00014       end
00015     else
00016       do
00017         Resource_List = "
00018         if DBMST ¬= "" then
00019           do
00020             Call Create_Lists 'DBMST' DBMST
00021             Resource_List = DBR_DB_List || Resource_list
00022           end
00023         if PART ¬= "" then
00024           Call Create_Lists 'PART' PART
00025             Resource_List = DBR_DB_List||Resource_list
00026           end
00027       end
00028     Return
```

FIGURE 7

| Code Lines | | Status | TC1 | TC2 | OVERFLOW |
|---|---|---|---|---|---|
| 00001 | Program X | T | T | T | |
| 00002 | Savearg = arg | T | T | T | |
| 00003 | REST=UPPER(SaveArg) | T | T | T | |
| 00004 | PARSE REST WITH 'DB=' DB . | T | T | T | |
| 00005 | PARSE REST WITH 'DBMST=' DBMST . | T | T | T | |
| 00006 | PARSE REST WITH 'PART=' PART . | A | R | R | |
| 00007 | /*****************************/ | X | | | |
| 00008 | /* Create DB list           */ | X | | | |
| 00009 | /*****************************/ | X | | | |
| 00010 | if DB ¬= "" then | T | T | T | |
| 00011 | do | T | T | | |
| 00012 | odb = "$"\|\|DB | C | R | | |
| 00013 | Push ODB\|\| '=ON' | D1 | R | | |
| 00014 | end | DE | R | | |
| 00015 | else | T | | T | |
| 00016 | do | T | | T | |
| 00017 | Resource_List = '' | T | | T | |
| 00018 | if DBMST ¬= "" then | T | | T | |
| 00019 | do | U | | | |
| 00020 | Call Create_Lists 'DBMST' DBMST | U | | | |
| 00021 | Resource_List = DBR_DB_List \|\| Resource_list | U | | | |
| 00022 | end | U | | | |
| 00023 | if PART ¬= "" then | N | | | |
| 00024 | Call Create_Lists 'PART' PART | N | | | |
| 00025 | Resource_List = DBR_DB_List\|\|Resource_list | N | | | |
| 00026 | end | N | | | |
| 00027 | end | T | | T | |
| 00028 | Return | T | T | T | |

FIGURE 8

| Code Lines | | Status | TC1 | TC2 | A:OVERFLOW.DAT |
|---|---|---|---|---|---|
| 00001 | Program X | T | T | T | T |
| 00002 | Savearg = arg | T | T | T | T |
| 00003 | REST=UPPER(SaveArg) | T | T | T | T |
| 00004 | PARSE REST WITH 'DB=' DB . | T | T | T | T |
| 00005 | PARSE REST WITH 'DBMST=' DBMST . | T | T | T | T |
| 00006 | PARSE REST WITH 'PART=' PART . | T | R | T | T |
| 00007 | /******************************/ | X | | | |
| 00008 | /* Create DB list           */ | X | | | |
| 00009 | /******************************/ | X | | | |
| 00010 | if DB ¬= "" then | T | T | T | T |
| 00011 | do | T | T | | T |
| 00012 | odb = "$"||DB | T | R | | T |
| 00013 | Push ODB|| '=ON' | T | R | | T |
| 00014 | end | T | R | | T |
| 00015 | else | T | | T | T |
| 00016 | do | T | | T | T |
| 00017 | Resource_List = '' | T | | T | T |
| 00018 | if DBMST ¬= "" then | T | | T | T |
| 00019 | do | T | | | T |
| 00020 | Call Create_Lists 'DBMST' DBMST | T | | | T |
| 00021 | Resource_List = DBR_DB_List || Resource_list | T | | | T |
| 00022 | end | T | | | T |
| 00023 | if PART ¬= "" then | T | | | T |
| 00024 | Call Create_Lists 'PART' PART | T | | | T |
| 00025 | Resource_List = DBR_DB_List||Resource_list | T | | | T |
| 00026 | end | T | | | T |
| 00027 | end | T | | T | T |
| 00028 | Return | T | T | T | T |

FIGURE 9

A:OVERFLOW.DAT start of file

TC3

TC4 end of file

FIGURE 10

| | |
|---|---|
| 00001 | Program X |
| 00002 | Savearg = arg |
| 00003 | REST=UPPER(SaveArg) |
| 00004 | PARSE REST WITH 'DB=' DB . |
| 00005 | PARSE REST WITH 'DBMST=' DBMST . |
| 00006 | PARSE REST WITH 'PART=' PART . |
| 00007 | /*******************************/ |
| 00008 | /* Create DB list              */ |
| 00009 | /*******************************/ |
| 00010 | if DB ¬= "" then |
| 00011 |   do |
| 00012 |     odb = "*"||DB |
| 00013 |     DB_out = ODB |
| 00014 |     Push ODB|| '=ON' |
| 00015 |   end |
| 00016 | else |
| 00017 |   do |
| 00018 |     Resource_List = '' |
| 00019 |     if DBMST ¬= "" then |
| 00020 |     do |
| 00021 |       Call Create_Lists 'DBMST' DBMST |
| 00022 |       Resource_List = DBR_DB_List || Resource_list |
| 00023 |     end |
| 00024 |     if PART ¬= "" then |
| 00025 |       Call Create_Lists 'PART' PART |
| 00026 |       Resource_List = DBR_DB_List||Resource_list |
| 00027 |     end |
| 00028 |   end |
| 00029 | Return |

FIGURE 11

| Code Lines | | Status | TC1 | TC2 | A:OVERFLOW.COM |
|---|---|---|---|---|---|
| 00001 | Program X | T | T | T | |
| 00002 | Savearg = arg | T | T | T | |
| 00003 | REST=UPPER(SaveArg) | T | T | T | |
| 00004 | PARSE REST WITH 'DB=' DB . | T | T | T | |
| 00005 | PARSE REST WITH 'DBMST=' DBMST . | T | T | T | |
| 00006 | PARSE REST WITH 'PART=' PART . | A | R | R | |
| 00007 | /*******************************/ | X | | | |
| 00008 | /* Create DB list            */ | X | | | |
| 00009 | /*******************************/ | X | | | |
| 00010 | if DB ¬= "" then | T | T | T | |
| 00011 | do | T | T | | |
| 00012 | odb = "*"\|\|DB | C | R | | |
| 00013 | DB_out = ODB | A | R | | |
| 00014 | Push ODB\|\| '=ON' | D1 | R | | |
| 00015 | end | DE | R | | |
| 00016 | else | T | | T | |
| 00017 | do | T | | T | |
| 00018 | Resource_List = " | T | | T | |
| 00019 | if DBMST ¬= "" then | T | | T | |
| 00020 | do | U | | | |
| 00021 | Call Create_Lists 'DBMST' DBMST | U | | | |
| 00022 | Resource_List = DBR_DB_List \|\| Resource_list | U | | | |
| 00023 | end | U | | | |
| 00024 | if PART ¬= "" then | N | | | |
| 00025 | Call Create_Lists 'PART' PART | N | | | |
| 00026 | Resource_List = DBR_DB_List\|\|Resource_list | N | | | |
| 00027 | end | N | | | |
| 00028 | end | T | | T | |
| 00029 | Return | T | T | T | |

FIGURE 12

```
00001    Program X
00002    Savearg = arg
00003    REST=UPPER(SaveArg)
00004    PARSE REST WITH 'DB=' DB .
00005    PARSE REST WITH 'DBMST=' DBMST .
00006    PARSE REST WITH 'PART=' PART .
00007    /*******************************/
00008    /* Create DB list              */
00009    /*******************************/
00010    if DB ¬= "" then
00011      do
00012        odb = "#"||DB
00013        Push  ODB|| '=ON'
00014      end
00015    else
00016      do
00017        Resource_List = "
00018        if DBMST ¬= "" then
00019          do
00020            Call Create_Lists 'DBMST' DBMST
00021            Resource_List = DBR_DB_List || Resource_list
00022          end
00023        if PART ¬= "" then
00024          Call Create_Lists 'PART' PART
00025          Resource_List = DBR_DB_List||Resource_list
00026        end
00027      end
00028    Return
```

FIGURE 13

| Code Lines | Status | TC1 | TC2 | A:OVERFLOW.COM |
|---|---|---|---|---|
| 00001    Program X | T | T | T | |
| 00002    Savearg = arg | T | T | T | |
| 00003    REST=UPPER(SaveArg) | T | T | T | |
| 00004    PARSE REST WITH 'DB=' DB . | T | T | T | |
| 00005    PARSE REST WITH 'DBMST=' DBMST . | T | T | T | |
| 00006    PARSE REST WITH 'PART=' PART . | A | R | R | |
| 00007    /****************************/ | X | | | |
| 00008    /* Create DB list           */ | X | | | |
| 00009    /****************************/ | X | | | |
| 00010    if DB ¬= "" then | T | T | T | |
| 00011        do | T | T | | |
| 00012            odb = "$"\|\|DB | CD1 | R | | |
| 00013            Push ODB\|\| '=ON' | D1 | R | | |
| 00014        end | DE | R | | |
| 00015    else | T | | T | |
| 00016        do | T | | T | |
| 00017            Resource_List = '' | T | | T | |
| 00018            if DBMST ¬= "" then | T | | T | |
| 00019                do | U | | | |
| 00020                    Call Create_Lists 'DBMST' DBMST | U | | | |
| 00021                    Resource_List = DBR_DB_List \|\| Resource_list | U | | | |
| 00022                end | U | | | |
| 00023            if PART ¬= "" then | N | | | |
| 00024                Call Create_Lists 'PART' PART | N | | | |
| 00025            Resource_List = DBR_DB_List\|\|Resource_list | N | | | |
| 00026            end | N | | | |
| 00027        end | T | | T | |
| 00028    Return | T | T | T | |

METHOD AND APPARATUS FOR MANAGING CODE TEST COVERAGE DATA

PROVISIONAL APPLICATION

This application claims the benefit of U.S. Provisional Application No. 60/097,266, entitled, "METHOD AND APPARATUS FOR CODE COVERAGE," filed on Aug. 20, 1998, which is incorporated by reference herein.

BACKGROUND OF THE INVENTION

1. Field of the Invention

This invention relates in general to a system for managing code coverage data, especially for a large scale development project.

2. Description of the Related Art

The testing of software during program development, from unit testing to functional and regression testing, is an ongoing task. The challenge of delivering quality tested code products has never been greater. The goal of testing is to verify the functionality of new and modified software As the size and complexity of a program increases, so does the amount of testing needed. Finding the right tools and processes to provide a better tested product is very difficult. Investing in the wrong tools or processes can be costly and possibility fatal for the product. A code coverage system seems to be a wise investment. Studies show that with 100% code coverage at the unit testing phase, one would detect 15% of the defects in the product. Another 45% of the defects could be found in the functional test phase. Questions which arise when evaluating a code coverage system include the following. Will a code coverage system really be a benefit? How does one collect code coverage data in a large scale development project when the code is constantly changing ? How does one store all of the data for a module that most of the test cases exercise?

With a code coverage system one can make intelligent decisions on what testing is needed. One can query the code coverage information and answer a number of questions:

1. What code has not been tested?
2. What is the test case overlap and which test cases can be deleted or combined?
3. When a code change is made to a module, what test cases need to be run?
4. When a set of test cases are run for changed code, what is the code coverage of the changed code?
5. Are new test cases needed for the new code?
6. If a defect was found, was the code tested? Were there test cases that exercised the defected area? (Casual Analysis).
7. What test cases are finding problems? Which ones are good candidates for regression testing?

Through this analysis, the testing cycle time can be reduced because selective test cases are executed as opposed to randomly selecting test cases.

Now that it has been established that a code coverage system will help in delivering a better tested product the characteristics of a large project will be examined. A large project usually has over 3 million lines of code, over 2000 modules and over 3000 test cases. The average release for the project is about one half million lines of new or changed code. It takes approximately 3 months to run all of the test cases.

During the functional testing phase of a project, new test cases are being executed to validate the product Code defects are found and fixed during this phase. How does one gather code coverage data during this testing phase? If one takes the approach of freezing the code, i.e. not allowing any changes, while collecting the code coverage data, there will be a never ending loop. Under this model, changes cannot be made to the code until after the code coverage data collection process is complete and the code can be un-frozen. Once the code has been changed, the code coverage data collection process must be repeated, and so on. If code coverage data collection is delayed until the the functional testing phase is over, the benefits of a code coverage system are not reaped. Also, the problem of continuous code changes being integrated into the product still exists, even though the changes may not be as frequent during later testing phases.

Another problem that arises with a large project is the amount of code coverage data that is generated. The question arises as to whether data for every test case should be saved for each line of code. Some code is common code, such as initialization code, and will be touched by all test cases. With 3000 test cases and 3 million lines of code, a very large database will be needed to store each line of code and each test case that exercised that line of code.

There exist today many code coverage systems in the industry.

For example, in one system, as tests are executed, each line of a test matrix that is executed is marked as such. This provides not only an indication of how many paths were executed by a given test, but also which specific paths. As the matrix is updated during all testing, it will be clear which paths have not been tested, and therefore what additional tests are needed to reach the target percentage of code coverage. "Automatic Unit Text Matrix Generation" IBM Technical Disclosure Bulletin Vol. 37, No. 6A (June, 1994).

Other systems also provide a way to execute test cases and determine the effectiveness or coverage of the testing. See e.g., "Software Test Coverage Measurement" IBM Technical Disclosure Bulletin Vol. 39, No. 8 (August, 1996); and Bradley et al., "Determination of Code Coverage" IBM Technical Disclosure Bulletin Vol. 25, No. 6 (November, 1982).

In yet another system, described in U.S. Pat. No. 5,673,387 to Chen et al., when a software system is changed, the set of changed entities are identified. This set of changed entities is then compared against each set of covered entities for the test units. If one of the covered entities of a test unit has been identified as changed, then that test unit must be rerun. A user may generate a list of changed entities to determine which test units must be rerun in the case of a hypothetical system modification.

In yet another system, described in U.S. Pat. No. 5,778,169 to Reinhardt, a programmer can use a test coverage tool to identify a subject of tests that executed a coverage point(s) corresponding to modified statements. This saves the programmer development time because the programmer can now run the subset of tests on an executable, compiled from the source code including the modified statements, and does not have to run the complete set of regression tests.

These past systems merely collect code coverage data and report on the data collected. Additionally, they describe how to collect more and better data to determine what test cases should be run or rerun.

However, none of these prior systems provide a tool or methodology to manage, preserve and keep track of code coverage data in a dynamic development environment.

SUMMARY OF THE INVENTION

To overcome the limitations in the prior art described above, and to overcome other limitations that will become apparent upon reading and understanding the present specification, the present invention discloses a method, apparatus and article of manufacture for a computer-implemented system for managing code coverage data.

In accordance with the present invention there is a provided a way to collect, maintain and preserve code coverage data each time test cases are executed and a way to handle code churn, i.e. code changes, without unnecessarily rerunning any test cases. Thus, in accordance with the present invention, the code coverage data, which may be stored in a database, is updated or resequenced when code changes are made to a program. This resequencing eliminates the need to freeze the program code while collecting the code coverage data. When a code change is incorporated into the system the resequencing routine makes the necessary adjustments to the code coverage data.

Furthermore, it may not be feasible to build a table in a database to store code coverage data for every test case. A user can reduce the table size needed by creating a table with a fixed number of columns in which to store the code coverage data. Then, in accordance with the present invention, the last column of the table may contain a pointer to a file. This file may then contain the test case results that exceeded the table.

Thus, an object of the present invention is to provide an effective code coverage data management system which eliminates the need to rerun an entire test case collection to re-collect code coverage data in order to have valid code coverage data.

It is another object of the present invention to reduce storage problems associated with code coverage data collection systems.

BRIEF DESCRIPTION OF THE DRAWINGS

The above objects and advantages of the present invention will become more apparent by describing in detail preferred embodiments thereof with reference to the attached drawings in which like reference numbers represent corresponding parts throughout:

FIG. 2 illustrates a sample program code listing;

FIG. 3 illustrates a sample code coverage database listing after an initial load for the program code listing illustrated in FIG. 2;

FIG. 4 illustrates the sample code coverage database listing after a first test case has been run;

FIG. 5 illustrates the sample code coverage database listing after a second test case has been run;

FIG. 6 illustrates the sample program code listing of FIG. 2 after it has been modified;

FIG. 7 illustrates the sample code coverage database listing incorporating changes associated with the modified program code listing of FIG. 6;

FIG. 8 illustrates the sample code coverage database listing when overflow occurs;

FIG. 9 illustrates the contents of an overflow file;

FIG. 10 illustrates the sample program code listing of FIG. 6 after it has been modified;

FIG. 11 illustrates the sample code coverage database listing after incorporating changes associated with the modified program code listing of FIG. 10;

FIG. 12 illustrates the sample program code listing of FIG. 10 after it has been modified; and FIG. 13 illustrates the sample code coverage database listing after incorporating changes associated with the modified program code listing of FIG. 12.

DETAILED DESCRIPTION OF THE PREFERRED EMBODIMENT

Figure 1:
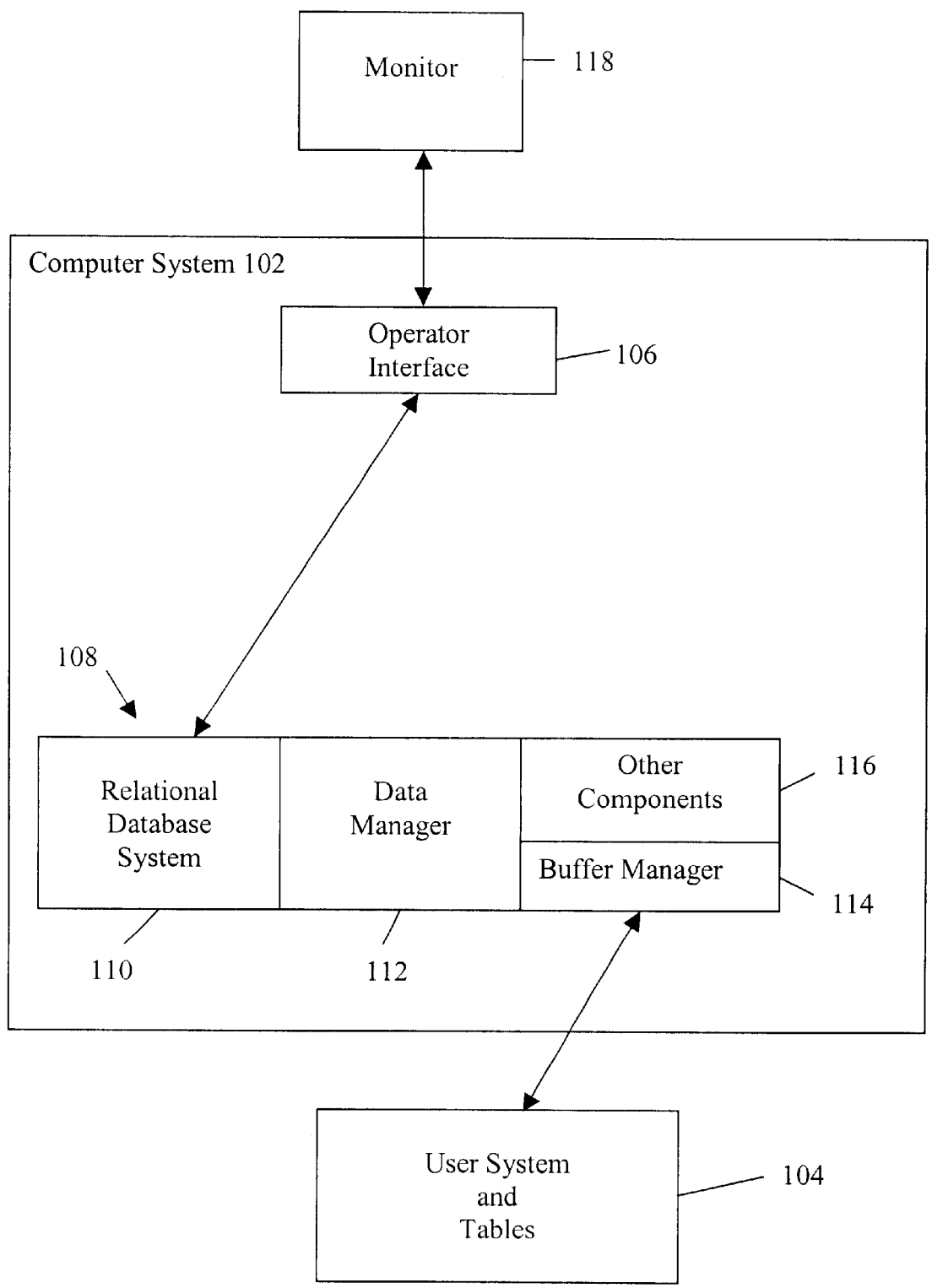
FIG. 1 illustrates an exemplary computer hardware environment that could be used in accordance with the present invention.

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

FIG. 1 illustrates an exemplary computer hardware environment that may be used in accordance with the present invention. In the exemplary environment, a computer system 102 is comprised of one or more processors connected to one or more data storage devices 104 that store one or more databases. A data storage device 104 may be a fixed or hard disk drive, a floppy disk drive, a CDROM drive, a tape drive, or other device.

Operators of the computer system 102 use a standard operator interface 106, such as IMS/DB/DC®, CICS®, TSO®, OS/390®, ODBC® or other appropriate interface, to transmit electrical signals to and from the computer system 102 that may represent commands for performing various search and retrieval functions, termed queries, against the databases. For example, these queries may employ Structured Query Language (SQL) and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In one embodiment of the present invention, the RDBMS software may comprise the DB2® Universal Database product offered by IBM Corporation (IBM) for the Windows 95® and Windows NT® operating systems. Windows 95® and Windows NT® are trademarks of Microsoft Corporation. Those skilled in the art will recognize, however, that the present invention has application to any RDBMS software or any database software generally, whether or not the software uses SQL. In addition, the present invention is not limited to the Windows 95® or Windows NT® operating systems. Rather, the present invention is applicable with any operating system platform.

At the center of the database software system is the Database Services module 108. The Database Services module 108 may contain several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

Generally, the database software and the instructions derived therefrom, and other system software, are all tangibly embodied in a computer-readable medium, e.g. one or more of the data storage devices 104. Moreover, the software and the instructions derived therefrom, are all comprised of instructions which, when read and executed by the computer system 102, causes the computer system 102 to perform the steps necessary to implement and/or use the present invention. Under control of an operating system, the software and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. One of skill in the art will appreciate that "media",or "computer-readable media",as used here, may include a diskette, a tape, a compact disc, an integrated circuit, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Of course, those skilled in the art will recognize that many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

In accordance with the present invention, for a given program, the code coverage database, which may for example be stored in data storage devices 104, may include a table where the rows in the table contain the lines of program code and the columns contain the test cases results for each line of the program code. The table may also include a STATUS column which identifies the current code coverage status of a particular line of program code. Thus, each line of program code may have associated with it a current status as well as the status or results of various test cases. It is to be noted that while the present discussion assumes the database is in table form, the present invention is not so limited. For example, the database may be a flat file.

The following is a list of the annotations which will be used throughout herein when discussing the code coverage database.

U—Untested code
R—Rerun Test Case
A—New line of code added (the previous line of code was covered by a test case)
C—Line of code changed
Dn—Code deleted and the number of lines deleted
DE—End of code deletion block (the line of code following the deleted code)
T—Code was tested
X—Comment line un-executeable code
N—New line of code added (the previous line of code was not covered by any test case)

FIG. 2 illustrates a sample program code listing for a simple program called X. From this program, a code coverage database table is built.

FIG. 3 illustrates what the code coverage database table, corresponding to the program illustrated in FIG. 2, looks like after an initial load. Every line of code in the program is represented in a row in the database table. The first column of the table contains the lines of code. The second column of the table is the STATUS column, which identifies the current code coverage status of the associated line of code. The remaining columns in the table are to be used for storing the status or results of various test cases. The width of the table may be limited by a system administrator based on a number of test cases for which coverage tracking is desired. The last column in the table shown in FIG. 3 is a Test Case Overflow column for any test cases beyond the maximum capacity of the table. The overflow situation will be discussed in further detail below.

In FIG. 3, all of the executable lines of code are marked with a STATUS code of "U" (Untested). The comment lines of code are marked with a STATUS code of "X" (Comment line un-executable code).

Now that the code coverage database table has been built, test cases can be executed. When a test case is executed, a code coverage tool is used to determine which line of code is executed in the program by the test case. The code coverage database table is then updated to reflect this coverage. FIG. 4 illustrates the results of the test case coverage after a test case, TC1, has been executed. TC1 may be constituted by the following command, for example:

START X (DB=TESTDB

The third column of the table has now been annotated with a "T" (code was tested) for every line of code that was covered, or executed, during execution of test case TC1 . The STATUS column has also been annotated with a "T" (code was tested) for every line of code that was covered, or executed, during execution of test case TC1. In this example, execution of the test case program TC1, resulted in the execution of code lines 00001–00005, 00009–00014 and 00024.

As various test cases are executed, the code coverage database table is updated. For example, FIG. 5 illustrates the results of the test case code coverage after a test case, TC2, is executed. The fourth column of the table is now is annotated with a "T" (code was tested) for every line of code that was covered, or executed, while executing test case TC2. The STATUS column has also been further annotated with a "T" (code was tested) for every line of code that was covered while executing test case TC2. Thus, the STATUS now reflects the cumulative coverage of all of the test cases executed to this point.

FIG. 6 illustrates the program X with modifications. In particular, lines 6 and 23–27 have been added to the original code, line 12 has been changed from the original code, and line 13 has been deleted from the original code.

Once changes have been made to the program code, the code coverage data in the table shown in FIG. 5 no longer correctly maps to the code shown in FIG. 6. Thus, in accordance with the present invention, the code changes must now be integrated into the code coverage database, while still preserving the previously collected code coverage data for code which has not been modified. In accordance with the present invention, a resequencing or remapping routine is used to go through the database and make changes corresponding to the modified code while still preserving the previously collected code coverage data so that the code coverage data is correctly mapped to the code.

FIG. 7 illustrates the table changes that result when the program changes are incorporated by the resequencing routine. In particular, since line 6 was added to the program code, a new row has been inserted into the code coverage database table. The STATUS column for this new row has been annotated with a "A" (new code added). The TC1 and TC2 columns have been annotated with a "R" (Rerun test case), since both of these test cases had previously tested the line of code prior to newly added line 6. Since line 12 was changed, the STATUS column associated with this line of code has been annotated with a "C" (line of code changed). The TC1 column associated with line 12 has been annotated with an "R" (rerun test case), since the test ease had previously tested this line of code. Line 13 from the original version of the program was deleted. In the code coverage database table the line is deleted, and new line 13 is annotated with "D1" (1 line of code is deleted). Line 14 is annotated with a "DE" (first line of code after deleted code). Lines 23–27 are lines of code newly added to the program and are annotated with a "N" (new code which is not covered by the current test cases, i.e. the newly inserted code is preceded by previously untested code). Thus, the resequencing routine acts to preserve the column entries of the table representing previously collected code coverage data and eliminates the need to rerun the test cases for code which was not modified or newly inserted. Further, the resequencing routine provides for informative annotations to the table. Additionally, queries may be made against this updated table to determine what test cases should subsequently be run in order to provide complete code coverage data.

Looking at FIG. 7, it can be seen that all of the columns are filled in except for the OVERFLOW column (the last column in the database table). This last column may contain the aggregate coverage results for additional test cases that are executed. The first row of this last column, which is the program name, may contain the file name of a file that includes the results of the overflow test cases.

For example, assume test cases TC3 and TC4 are executed. FIG. 8 reflects the results of the test case coverage after running test cases TC3 and TC4. The last column of the table is annotated with a "T" (code was tested) for every line of code that was covered, or executed, while executing either of test cases TC3 and TC4, the test cases which do not fit into the table. The STATUS column is also updated by annotating with a "T" (code was tested) every line of code that was covered, or executed, while executing either of test cases TC3 and TC4. The STATUS now reflects the overall coverage of all of the test cases executed to this point. Additionally, the first row in the OVERFLOW column of FIG. 8 contains the filename of the file (A:OVERFLOW.DAT) where the overflow test cases are stored. An example of the contents of the overflow file may be seen in FIG. 9, where TC3 and TC4 are in the file.

Now, other types of program code modifications will be addressed. For example, assume that the program X, shown in FIG. 6 is modified so that new code is inserted after a changed line of code in the program, as shown in FIG. 10. The code coverage database table changes, made to the table shown in FIG. 7, which result when the resequencing routine is run are shown in FIG. 11. In particular, since line 12 was changed the STATUS column is annotated with a "C" (line of code was changed). The TC1 column associated with line 12 is annotated with an "R" (rerun test case) since the test case had previously tested this line of code. Further, line 13 was added to the code and thus, a new row has been inserted into the table shown in FIG. 11. The STATUS column associated with this new row is annotated with an "A" (new code added). The TC1 column associated with this row is also annotated with an "R" (rerun test case) since the test case had previously tested the line of code prior to this new one.

In another example, program X may be further modified by changing line 12 and deleting line 13. FIG. 12 illustrates the program X as modified from the program shown in FIG. 10. Once again, the resequencing routine will be run and the code coverage database table will be updated, as shown in FIG. 13. The STATUS column for changed line 12 is annotated with a "C" (line of code changed). The TC1 column associated with line 12 is annotated with an "R" (rerun test case) since the test case had previously tested the line of code. Line 13 is the line which was deleted. Thus, in the table, the line of code previously associated with line 13 has been deleted and the STATUS column for line 12 has been further annotated with "D1" (one line of code has been deleted).

In summary, the code coverage management system of the present invention operates in the following context. Initially, a program for which code coverage data should be collected is identified. The program is then compiled with a code coverage utility inserting the appropriate collection probes. At this point, a determination is made as to how many test cases a code coverage database table should handle. Then, the code coverage database table is built and the program is loaded. Subsequently, the suite of test cases is run to collect code coverage data for the code coverage database table. If any code changes are made, a resequencing routine is run to update the code coverage database. Then, the status information in the resequenced database table may be queried to determine which test cases need to be rerun. If there are more test cases executed than will fit in the code coverage database table, an overflow file may be used to store the results of the overflow test cases.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented system for managing code coverage data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for managing code coverage data for a program, the code coverage data being stored in a database associated with the program, the method comprising the steps of:

collecting code coverage data in the database, thereby providing a mapping between the code coverage data and the program, wherein said code coverage data includes at least one status annotation for each line of code in the program, the code coverage data being collected as a result of execution of at least one test case, and when the program is modified, executing a resequencing function upon the database, thereby preserving the previously collected code coverage data and incorporating entries into the database associated with modified portions of the program to provide an updated mapping between the code coverage data and the program, and after the executing a resequencing function step, determining from the at least one code coverage status column and the at least one test case status column which of the at least one test case to run or rerun.

2. The method according to claim 1, wherein the database is in table format, where the table contains each line of the program in a row of the table, at least one code coverage status column and at least one test case status column.

3. The method according to claim 2, wherein during the executing a resequencing function step, the at least one code coverage status column and at least one of the test case status column are updated with at least one annotation.

4. The method according to claim 3, wherein each annotation includes an indication for one or more of the following: which line(s) of the program have been tested; which line(s) of the program have been untested; whether rerun of a test case is needed; new line(s) of the program which have been added; line(s) of the program which have been changed; line(s) of the program which have been deleted; and line(s) of the program which are non-executable.

5. The method according to claim 2, further comprising the step of:

prior to the step of collecting code coverage data, determining a maximum number of columns in the table, the table including one column for each of the at least one test case.

6. The method according to claim 5, wherein the last column of the table contains aggregate results of all of the overflow test cases, and wherein the last column has a first row containing a pointer to a file for storing overflow test cases.

7. The method according to claim 5, wherein the file is a flat file.

8. The method according to claim 2, wherein the at least one code coverage status column contains aggregate results of all of the at least one test case.

9. An apparatus for managing code coverage data for a program, the code coverage data being stored in a database associated with the program, the apparatus comprising:

a computer having a data storage device connected thereto, wherein the data storage device stores the database; and one or more computer programs executed by the computer for:

collecting code coverage data in the database, thereby providing a mapping between the code coverage data and the program, wherein said code coverage data includes at least one status annotation for each line of code in the program, the code coverage data being collected as a result of execution of at least one test case, when the program is modified, executing a resequencing function upon the database, thereby preserving the previously collected code coverage data and incorporating entries into the database associated with modified portions of the program to provide an updated mapping between the code coverage data and the program, and determining from the at least one code coverage status column and the at least one test case status column which of the at least one test case to nm or rerun after the executing a resequencing function.

10. The apparatus according to claim 9, wherein the database is in table format, where the table contains each line of the program in a row of the table, at least one code coverage status column and at least one test case status column.

11. The apparatus according to claim 10, wherein the one or more computer programs performed by the computer further updates the at least one code coverage status column and at least one test case status column with at least one annotation during the executing a resequencing function.

12. The apparatus according to claim 11, wherein each annotation includes an indication for one or more of the following: which line(s) of the program have been tested; which line(s) of the program have been untested; whether rerun of a test case is needed; new line(s) of the program which have been added; line(s) of the program which have been changed; line(s) of the program which have been deleted; and line(s) of the program which are non-executable.

13. The apparatus according to claim 10, wherein the one or more computer programs performed by the computer further:

determines a maximum number of columns in the table prior to the collecting code coverage data, the table including one column for each of the at least one test case.

14. The apparatus according to claim 13, wherein the last column of the table contains aggregate results of all of the overflow test cases, and wherein the last column has a first row containing a pointer to a file for storing overflow test cases.

15. The apparatus according to claim 13, wherein the file is a flat file.

16. The apparatus according to claim 10, wherein the at least one code coverage status column contains aggregate results of all of the at least one test case.

17. An article of manufacture comprising a program storage device readable by a computer and tangibly embodying one or more programs of instructions executable by the computer to perform method steps for managing code coverage data for a program, the code coverage data being stored in a database associated with the program, the method comprising the steps of:

collecting code coverage data in the database thereby providing a mapping between the code coverage data and the program, wherein said code coverage data includes at least one status annotation for each line of code in the program, the code coverage data being collected as a result of execution of at least one test case, when the program is modified, executing a resequencing function upon the database, thereby preserving the previously collected code coverage data and incorporating entries into the database associated with modified portions of the program to provide an updated mapping between the code coverage data and the program, and after the executing a resequencing function step, determining from the at least one code coverage status column and the at least one test case status column which of the at least one test case to run or rerun.

18. The article of manufacture according to claim 17, wherein the database is in table format, where the table contains each line of the program in a row of the table, at least one code coverage status column and at least one test case status column.

19. The article of manufacture according to claim 18, wherein during the executing a resequencing function step, the at least one code coverage status column and at least one of the test case status column are updated with at least one annotation.

20. The article of manufacture according to claim 19, wherein each annotation includes an indication for one or more of the following: which line(s) of the program have been tested; which line(s) of the program have been untested; whether rerun of a test case is needed; new line(s) of the program which have been added; line(s) of the program which have been changed; line(s) of the program which have been deleted; and line(s) of the program which are non-executable.

21. The article of manufacture according to claim 18, further comprising the steps of:

prior to the step of collecting code coverage data, determining a maximum number of columns in the table, the table including one column for each of the at least one test case.

22. The article of manufacture according to claim 21, wherein the last column of the table contains aggregate results of all of the overflow test cases, and wherein the last column has a first row containing a pointer to a file for storing overflow test cases.

23. The article of manufacture according to claim 21, wherein the file is a flat file.

24. The article of manufacture according to claim 18, wherein the at least one code coverage status column contains aggregate results of all of the at least one test case.

* * * * *

UNITED STATES PATENT AND TRADEMARK OFFICE
CERTIFICATE OF CORRECTION

PATENT NO. : 6,536,036 B1
DATED : March 18, 2003
INVENTOR(S) : Thomas J. Pavela

It is certified that error appears in the above-identified patent and that said Letters Patent is hereby corrected as shown below:

Column 9,
Line 66, delete "nm", insert -- "run" --

Signed and Sealed this

Twenty-ninth Day of July, 2003

JAMES E. ROGAN
*Director of the United States Patent and Trademark Office*